Patented Oct. 26, 1937

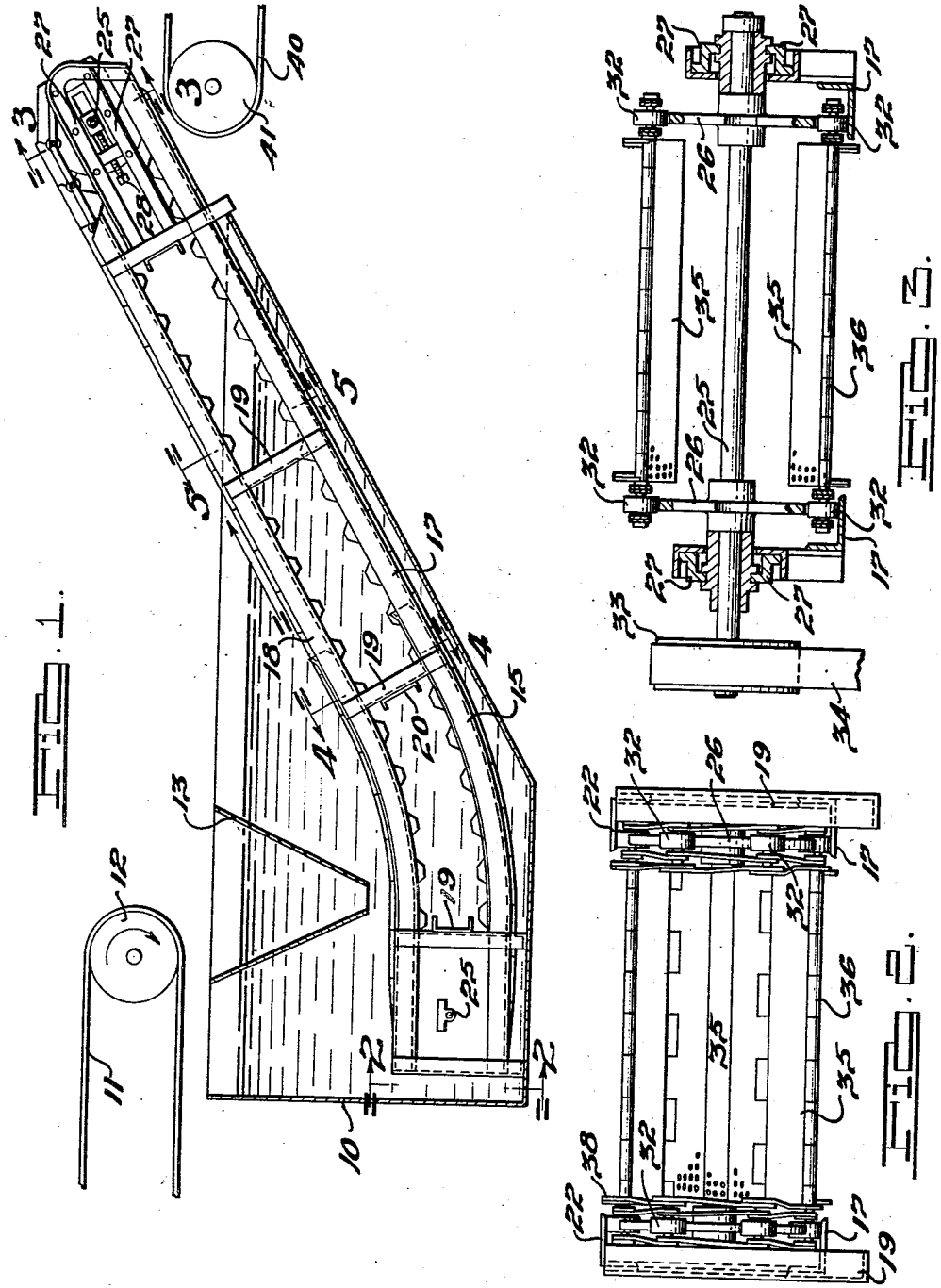

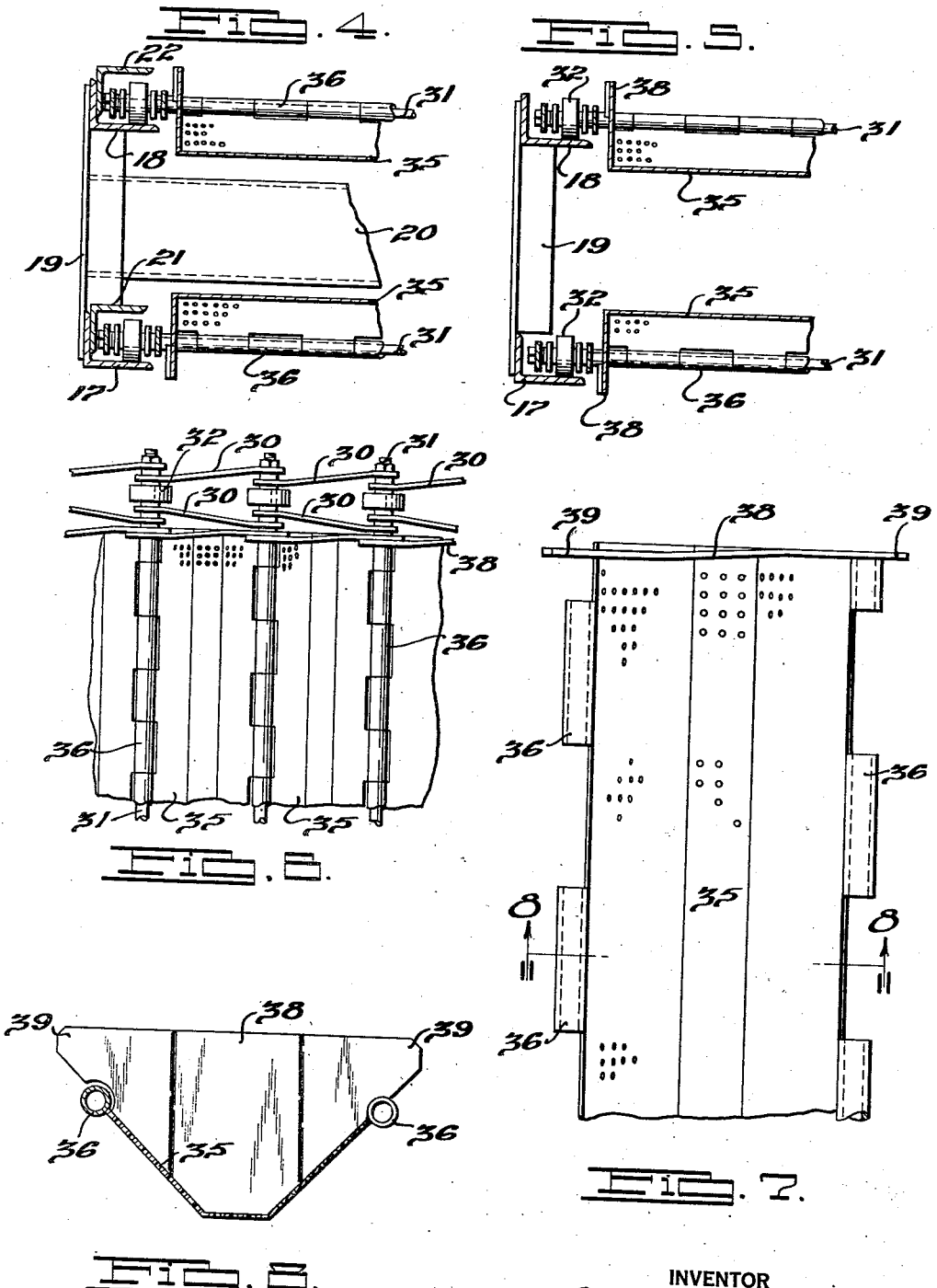

2,096,948

UNITED STATES PATENT OFFICE 2,096,948

CONVEYER SYSTEM

Gerrit Waalkes, Highland Park, Mich., assignor to Anchor Steel & Conveyor Co., a corporation of Michigan Application December 20, 1935, Serial No. 55,326

2 Claims. (Cl. 198—152)

The present invention relates to conveyers. More particularly it relates to a novel and efficient conveyer structure particularly adaptable for handling articles of relatively small size though extremely efficient for handling articles of various sizes.

While it will be apparent to those skilled in the art that the conveyer construction herein shown and described will find particular adaptability in use in connection with the removal of relatively small articles from a quenching bath after heat treatment, it will be appreciated that the invention in its broader aspects will find great and practical utility in many other fields.

It is a general object of the present invention to provide a conveyer system which is extremely rugged yet simple in construction, and which vertually eliminates cracks and crevices between the pivotally mounted part thereof in order that articles falling on the surface of the conveyer will be competently handled thereby irrespective of their size or shape.

It is another object of the present invention to provide a conveyer system in which the pans or buckets making up the article receiving bed of the conveyer are of novel and unique construction and are so mounted with respect to each other that although considerable pivotal movement between adjacent pans may take place, no cracks or crevices are opened up which might serve to waste or lose articles deposited on the conveyer.

As is conventional in conveyer systems of this generic class, the present invention contemplates the utilization of a plurality of pivotally interconnected pans or buckets. These pans or buckets are supported at the side edges of the conveyer system by means of a pair of endless chains composed of a plurality of links and carrying rollers journaled for rotation in the chains at suitable intervals therealong. These rollers and links, making up the side chains of the conveyer, are supported at opposite ends of the conveyer system by means of suitable conventional sprocket wheels which are in turn secured to shafts by means of which the conveyer system as a whole may be driven, and are supported between their ends on suitable or conventional supporting guideways.

Yet another novel feature of the present invention consists in the provision of a novel pan or bucket construction, in which the individual pans are pivotally connected together by means of piano type of hinges at their adjacent edges. This construction has, as will hereinafter be seen, been found particularly adaptable for constructions of this type inasmuch as the pivotal connection thus afforded virtually eliminates the cracks and crevices normally occurring between the pivotal sections of conveyer systems.

Still further the present invention contemplates the provision of a novel and unique end wall construction for each of the pans comprising aprons which extend above the pivotal connections of the adjacent pans and overlap the aprons of the next adjacent pans thus providing a tight substantially continuous relatively high wall at the edges of the conveyer system.

Heretofore aprons have been provided for conveyers of this general type. However, in the past such aprons have been carried by the side chains, thus requiring clearance between them and the adjacent buckets. The present invention contemplates the provision of a conveyer construction in which the aprons forming the end wall of the individual pans are permanently secured thereto and form a substantially integral part thereof, thus affording a construction in which the aprons are supported entirely independent of side chains.

Still further the present invention contemplates a conveyer construction in which bolts or rods extend the entire transverse width of the conveyer and constitute not only the pivotal interconnections for the chains at both sides but serve to provide the pintles for the hinges interconnecting the adjacent pans or buckets.

Many other and further objects and advantages of the generic inventive concept disclosed in this application will be apparent from a consideration of the following specification when taken in connection with the accompanying drawings forming a part thereof.

In the drawings,

Fig. 1 illustrates in sections a quenching tank showing one form of the improved conveyer mounted therein for removing articles therefrom.

Fig. 2 is an end elevational view taken on the line 2—2 of Fig. 1 showing in elevation one end of the conveyer.

Fig. 3 is a sectional view taken on the line 3—3 of Fig. 1 showing the manner in which the conveyer is mounted upon the sprocket wheels at the upper end thereof.

Fig. 4 is an enlarged fragmentary sectional view taken on the line 4—4 of Fig. 1 showing the manner in which the conveyer is mounted for movement in its frame in the lower portion thereof.

Fig. 5 is an enlarged fragmentary sectional view taken on the line 5—5 of Fig. 1 showing the manner in which the conveyer is mounted in its frame at the upper end thereof.

Fig. 6 is an enlarged fragmentary plan view of a portion of the conveyer showing in detail the manner in which the pans are mounted with respect to the linkage at the sides thereof.

Fig. 7 is an enlarged fragmentary plan view of one of the conveyer pans.

Fig. 8 is a sectional view taken on the line 8—8 of Fig. 7 showing the apron mounted in the pan at one end thereof and the relative position of this apron with respect to the hinge members serving to pivotally interconnect the adjacent pans.

With more particular reference to the drawings, the specific embodiment of the invention illustrated therein shows the conveyer in an installation adapted for removing articles from a quenching bath after they have been heat treated.

It will be clearly apparent that the specific embodiment of the invention disclosed in the drawings is merely illustrative of one preferred installation and that the invention disclosed herein will find great utility in many other fields.

In Fig. 1 is shown a tank 10 adapted to contain oil, water or other suitable liquid conventionally used for quenching heat treated articles. The heat treated articles are fed from the furnace in which they have been heated to the tank by means of a conventional conveyer 11 which passes around a pulley 12 and serves to drop the articles therefrom into a hopper 13 permanently mounted in the tank 10. The hopper 13 serves to localize the area of the conveyer on which the quenched, heat treated articles will fall and to insure that they will be guided on to the surface of the conveyer to be conducted from the tank as hereinafter described.

The improved conveyer comprises a frame generally designated as 15 and extending throughout a suitable desired longitudinal length. Frames of this general type are quite conventional in the art and while any suitable framework may be used in connection with the improved conveyer structure, it has been found exceedingly convenient and practical to provide a framework composed of metallic angle members. At each of the lateral sides of the conveyer, lower trackway elements 17 extend throughout substantially the length of the conveyer system and have spaced thereabove upper trackway elements 18 connected to the lower trackway elements by means of suitable upright spacing braces 19. These trackway elements are preferably spaced sufficiently to guide the side chains on to the driving and idle sprockets hereinafter described.

The trackway elements 17 and 18 at one side of the frame are spaced from the trackway element at the opposite side of the frame by means of suitable transverse braces 20 of channel section, secured to the spacing braces 19. Throughout the lower or curved end of the conveyer structure, it is preferable to provide some means for insuring that the conveyer rollers hereinafter described will be maintained adjacent their respective trackways and consequently it has been found desirable to provide guide elements 21 which cooperate with the trackway 17 in order to provide bearing surfaces on both the upper and lower sides of the conveyer rollers as they pass therealong. Similar trackway elements 22 cooperate with the upper trackway element 18 in order to provide an inwardly presenting channel adapted to receive the rollers of the conveyer.

At the opposite ends of the conveyer journaled in suitable bearings in the frame work are shafts 25 on which are mounted suitable sprocket wheels 26 which serve to engage the conveyer rollers and chains, hereinafter described, and drive the conveyer continuously. While any suitable adjusting mechanism may be utilized for tensioning the conveyer as a whole, I have shown by way of example a pair of guideways 27 located at the upper end of the conveyer, in which the bearings for the shaft 25 are longitudinally movable. Suitable adjusting bolts 28 are provided for taking up slack in the conveyer as a whole, and maintaining the entire system in proper adjustment.

The chains which serve to drive the conveyer comprise a plurality of pairs of link members 30 which may be of any desired length depending upon the particular construction of the pans which it is desired to use. These links 30 are journaled on suitable transverse bolts 31 which preferably extend the entire transverse width of the conveyer. These bolts 31 serve to provide pivotal mountings for the chain links 30 and as will hereinafter be seen serve to provide support for and pivotal mounting of the pans constituting the body portion of the conveyer. Suitable rollers 32 are journaled on each of the bolts 31 between the ends of each pair of links 30. These rollers 32 are adapted to engage and run on the trackway elements 17 and 18 described above and at the ends of the conveyer are adapted to engage suitable notches in the peripheries of the sprocket wheels 26 in order that the conveyer as a whole may be positively driven thereby. As will be seen by reference to Fig. 3, the shaft 25, carrying the sprocket wheels 26, may be rotated by means of a suitable pulley or sprocket 33 secured thereto driven by means of a belt or chain, respectively, 34 from any suitable source of power not shown.

From the foregoing, it will be appreciated that the linkage structure at the side edges of the conveyer system comprises a plurality of links pivotally interconnected and having rollers therebetween which serve to run on the trackways of the conveyer frame and engage the sprockets 26 at the ends of the conveyer. Further, it will be appreciated that both the links and rollers are pivotally mounted on transverse rods or bolts 33 which extend the complete transverse width of the conveyer and as will hereinafter be seen also serve the purpose of supporting the pans forming the body portion of the conveyer system.

While it will be appreciated that substantial departures from the specific physical structure of the pans disclosed in the drawings may be made, depending upon the particular type of articles which it is desired to handle, by way of illustration the drawings disclose a type of pan which has been found particularly satisfactory for handling relatively small articles in quenching operations. For this particular type of use, the pan comprises a perforated sheet metal member 35 preformed to provide the bottom and side walls of the pan. At suitable intervals along the edges of this member 25 are welded tubular members 36 which serve to provide means for supporting the pans. These tubular members preferably have an inside diameter just slightly larger than the bolt 31 and the individual tubular members 36 may be made in convenient uniform lengths and are preferably spaced apart substantially the same distance as their lengths in order to interfit with similar tubular members welded to the adjacent edge of the next adjacent pan. These members are adapted to be slid over the bolts 31 which, as has been explained above, extend substantially the entire transverse width of the conveyer structure. Consequently the bolts 31 not only serve to provide the pivotal connection for the linkage but constitute pintles for the hinge structure between the pans.

Aprons 38 are preferably welded or secured by any convenient means to form a tight closure at the ends of the pans and it has been found preferable to extend these aprons 38 substantially above the pivotal mounting of the marginal edges of the pans. The aprons 38 are preferably formed to provide wing portion 39 which extends over and laterally beyond the marginal edges of the pans and the aprons are preferably offset in their body portions so that the apron of one pan will substantially overlap the apron of the next adjacent pan and together these aprons will provide a substantially continuous side wall at the lateral edge of the conveyer structure. It will be appreciated that the side walls formed by these aprons, due to their overlapping relation, will be substantially continuous throughout the length of the conveyer irrespective of the flexing or bending thereof.

Inasmuch as the aprons 38 are permanently secured to, and form an integral part of the conveyer pans or buckets, it will be appreciated that no cracks or crevices between the buckets and aprons will exist. Likewise, it will be appreciated that the piano hinge construction between the adjacent pans virtually eliminates any cracks or crevices into which articles might fall and become wedged or through which the articles might fall and become lost in the quenching bath.

From the foregoing, it will readily be appreciated that articles either small or large may be deposited upon the surface of the conveyer anywhere between the side walls formed by the aprons 38 at the end of the pans, and that no cracks or crevices will occur during flexing of the conveyer, which would permit the escape of these articles from the conveyer system.

In the operation of the specific embodiment of the invention disclosed in Figure 1, it will be seen that heated articles from the heat treating furnace (not shown) will be conveyed by means of the conventional conveyer 11 over into the hopper 13 and will be quenched by the bath in the tank 10. It will be appreciated that the hopper 13 directs these falling articles as they descend into the bath and will serve to distribute them upon the surface of the conveyer throughout an area between the side walls formed by the aprons 38. Inasmuch as the conveyer as a whole is driven by means of the belt 34, pulley 33, shaft 25 and sprocket 26, as described above, the articles distributed in the pans of the conveyer will be carried upwardly, the path of movement of the conveyer as a whole being controlled by the trackways 18 and 22. As the pans carried by the transverse rods 31 pass over the sprocket 26 at the upper end of the conveyer, it will be seen that the pans will be inverted and will deposit the articles carried therein upon a suitable conveyer 40 passing around a pulley 41 and consequently remove the articles treated from the improved conveyer system.

While, as has been explained above, the specific embodiment of the invention herein illustrated merely discloses one application of the generic inventive concept presented, it will be appreciated that the invention disclosed will find wide and practical utility in many other fields and applications. Many other and further modifications of the invention defined in the subjoined claims will be apparent to those skilled in the art.

I claim as my invention:

1. A conveyer comprising a plurality of sheet metal buckets, bolts interconnecting adjacent buckets, the marginal edges of said buckets having alternate portions connected to said bolts to provide continuous piano hinges between adjacent buckets, the side walls of said buckets sloping downwardly toward each other to provide article receiving recesses disposed below the level of said hinges, end walls permanently secured to said buckets to close the ends of said article receiving recesses and extending substantially above the level of said hinges and links pivotally connecting adjacent bolts to provide sprocket chains along the sides of the conveyer.

2. A conveyer comprising a plurality of sheet metal buckets, transversely extending rods serving to interconnect adjacent buckets, the marginal portions of said buckets having alternate portions connected to said rods to provide continuous piano hinges between adjacent buckets, the side walls of said buckets sloping downwardly toward each other to provide article-receiving recesses below the level of said hinges, end walls permanently secured to said buckets to close the ends of said article-receiving recesses, said end walls extending substantially above the level of said hinges with portions of the end wall of one bucket substantially overlapping a portion of the end walls of the next adjacent buckets, and links pivotally connecting adjacent rods to provide sprocket chains along the sides of said conveyer.

GERRIT WAALKES.